Dec. 22, 1970  E. G. SPISAK  3,549,204
VEHICLE WHEEL ASSEMBLY
Filed Aug. 21, 1968
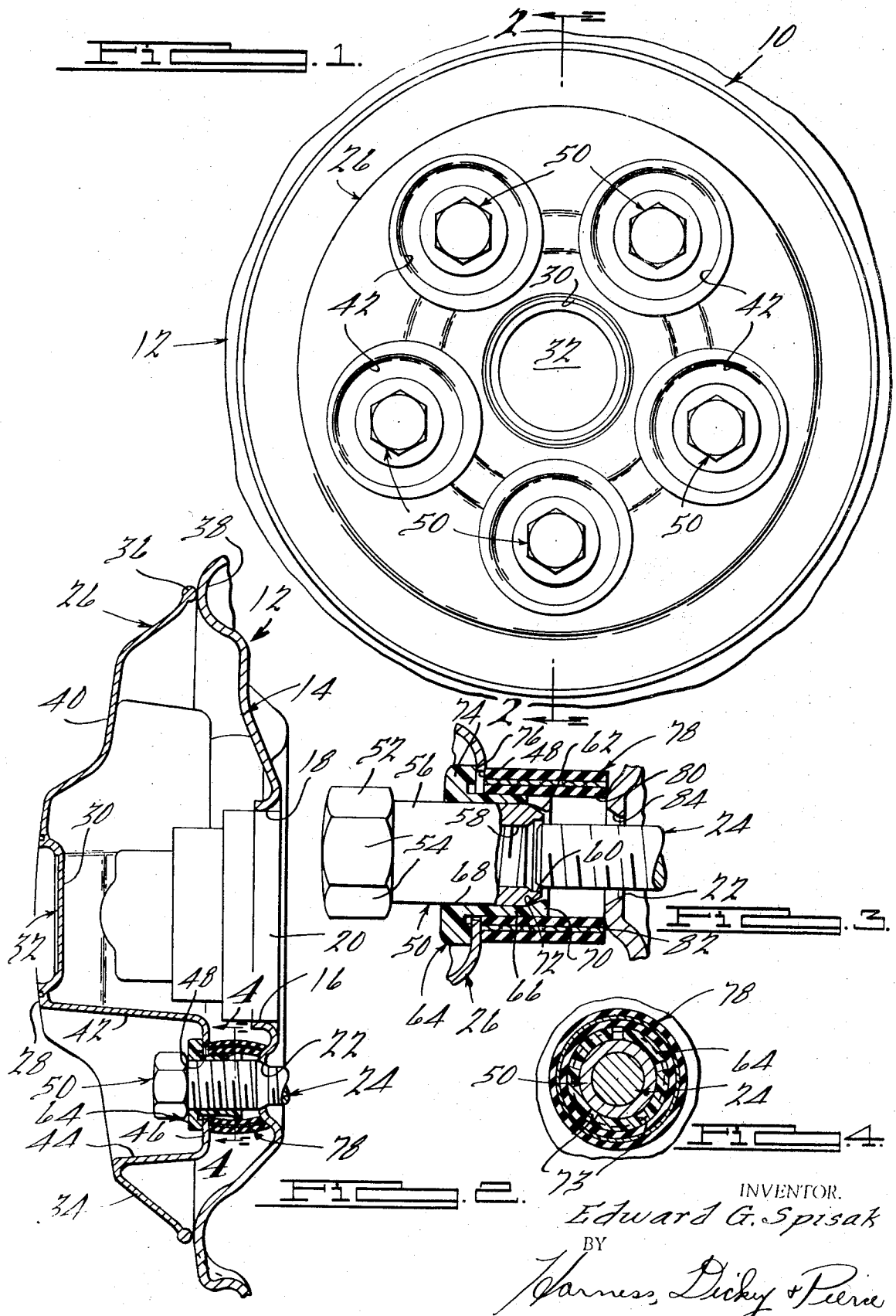
INVENTOR.
Edward G. Spisak
BY
Harness, Dickey & Pierce
ATTORNEYS.

United States Patent Office 3,549,204
Patented Dec. 22, 1970

3,549,204
VEHICLE WHEEL ASSEMBLY
Edward G. Spisak, Wayne, Mich., assignor to Gar Wood Industries, Inc., Wayne, Mich., a corporation of Michigan
Filed Aug. 21, 1968, Ser. No. 754,173
Int. Cl. B60b 7/06
U.S. Cl. 301—37                    7 Claims

ABSTRACT OF THE DISCLOSURE

A vehicle wheel assembly comprising a wheel having a wheel spider member provided with a central mounting portion and a peripheral rim engaging portion, the mounting portion defining a central hub receiving opening and a plurality of circumferentially spaced stud receiving openings arranged radially outwardly from the central opening; a wheel cover member having a central section, an outer peripheral section disposed in close proximate relation with the axially outer side of the spider member, and an intermediate section arranged radially between the central and peripheral sections, the cover member being formed with a plurality of circumferentially spaced openings each of which is radially and axially aligned with one of the stud receiving openings in the wheel spider member, a plurality of fastening members extending radially through the openings in the wheel cover member and threadably engaged with the wheel studs for operatively securing the wheel and the wheel cover member to the vehicle, and means in the form of a plurality of resilient retaining members associated one with each of the fastening members for fixedly securing the fastening members and wheel cover member to the wheel.

BACKGROUND OF THE INVENTION

Generally speaking, the present invention is directed toward a new and improved wheel assembly for automotive vehicles The subject assembly comprises a conventional vehicle wheel having a radially disposed spider member and a tire supporting rim extending therearound. The hub portion of the wheel spider is provided with a hub cover member which is adapted to partially cover the central portion of the wheel and be secured, along with the wheel itself, to the mounting studs on the vehicle axle by means of a plurality of fastening members which extend through axially and radially aligned openings formed in the hub cover member and wheel spider. Each of the fastening members is provided with an internally threaded bore adapted to threadably receive the wheel mounting studs, with the axially outer ends of the fastening members being provided with wrench engaging head sections for facilitating tightening and loosening thereof by means of conventional wrench-like tools or the like. Each of the fastening members is provided with an annular sleeve member which extends coaxially thereof interjacent the axially inner side of the wheel spider member and the axially inner side of the hub cover member, which sleeve members are adapted to be maintained under a state of compression between the hub cover member and wheel, whereby to prevent any relative movement of the cover member with respect to the wheel. Means in the form of an annular retaining member is provided on each of the fastening members and is adapted to be positively engaged with the inner periphery of the associated sleeve member for assuring positive mounting of the fastening members and thus prevent inadvertent loosening thereof. The wheel assembly of the present invention will be found to be of an extremely simple design and hence may be easily assembled and economically manufactured, thus promoting the economies of mass production.

SUMMARY OF THE INVENTION

This invention relates generally to vehicle wheels and, more particularly, to a new and improved wheel assembly for automotive vehicles.

It is accordingly a general object of the present invention to provide a new and improved wheel assembly for automotive vehicles.

It is a more particular object of the present invention to provide a new and improved wheel assembly comprising a vehicle wheel and hub cover member therefor which are of an extremely simple design, durable in construction and pleasant in appearance.

It is another object of the present invention to provide a new and improved vehicle wheel assembly which is provided with an improved means for preventing any relative movement between the wheel and hub cover member therefor.

It is yet another object of the present invention to provide a new and improved wheel assembly of the above character which provides means for positively preventing inadvertent loosening movement of the fastening means utilized for securing the wheel and hub cover member therefor to the associated vehicle.

It is another object of the present invention to provide a new and improved vehicle wheel assembly which is economical to commercially manufacture, and relatively simple to assemble on the associated vehicle.

Other objects and advantages of the present invention will become apparent from the following detailed description taken in conjunction with the accompanying drawing.

BRIEF DESCRIPTION OF THE DRAWING

FIG. 1 is a side elevational view of a vehicle wheel assembly embodying the principles of the present invention;

FIG. 2 is a transverse cross-sectional view taken substantially along the line 2—2 of FIG. 1;

FIG. 3 is an enlarged fragmentary cross-sectional view of a portion of the assembly shown in FIG. 2 with an associated fastening member in a partially mounted position, and FIG. 4 is an enlarged fragmentary cross-sectional view taken substantially along the line 4—4 of FIG. 2.

DETAILED DESCRIPTION OF PREFERRED EMBODIMENT

For convenience of decsription, the terms "axially inner," "axially outer" and words of similar import will have reference to the vehicle wheel assembly of the present invention hereinafter described in detail, with the axially outer side of the subject wheel assembly being at the left side of FIG. 2. Likewise, the terms "radially inner," "radially outer," and derivatives thereof will have reference to the geometric center of the vehicle wheel assembly of the present invention and the various component parts thereof.

Referring now to the drawing, a vehicle wheel assembly 10, in accordance with a preferred embodiment of the present invention, is shown as comprising a vehicle wheel 12 having a generally radially disposed wheel spider member 14. As best seen in FIG. 2, the spider member 14 is formed with a central axially outwardly extending annular flange section 16 which defines a central hub receiving opening 18 adapted to have the outer end portion 20 of an associated wheel hub member extend therethrough. The spider member 14 is also formed with a plurality of circumferentially spaced stud receiving openings 22 which are arranged radially outwardly from the opening 18 and are adapted to have a plurality of wheel mounting studs, one of which is illustrated herein and designated by the numeral 24, received therein. The assembly 10 also comprises a hub cover member, generally designated 26, operatively associated therewith, which member 26 is adapted to be fixedly secured to the axially outer side of the wheel 12 at a position substantially covering the center of the wheel spider member 14 and hub portion 20, as will hereinafter be described.

As illustrated in FIG. 2, the hub cover member 26 comprises a central annular section 28 which defines a generally circular shaped central recessed portion 30 adapted to operatively support an associated decorative medallion, emblem, or the like, such as the generaly flat or disc shaped emblem 32 illustrated in FIGS. 1 and 2. The hub cover member 26 also comprises an outer peripheral section 34 which is formed with an annular, enlarged thickness bead portion 36 around the radially outer edge thereof that is disposed in close proximate relation with respect to the axially outer side of an arcuate, axially outwardly projecting portion 38 of the spider member 14. The cover member 26 further comprises an intermediate section 40 which is arranged radially between the central section 28 and outer peripheral section 34 thereof and is formed as an integral part thereof.

As best illustrated in FIGS. 1 and 2, the hub cover member 26 is formed with a plurality of circumferentially spaced, generally cup-shaped axially inwardly tapered recessed portions, generally designated 42, which are radially and axially aligned with respect to the center of the hub cover member 26 such that when the member 26 is axially aligned with the spider member 14, said recessed portions 42 are radially and axially aligned with the stud receiving openings 22 in the spider member 14. Each of the recessed portions 42 comprises an annular side wall 44 which terminates at its axially inner end in a generally radially extending end wall 46 that defines an annular opening 48. In a preferred construction of the present invention, the recessed portions 42 are formed as integral parts of the hub cover member 26 which may, for example, be fabricated of a die cast metal.

In accordance with the principles of the present invention, the hub cover member 26, together with the vehicle wheel 12, is adapted to be operatively secured to the associated vehicle by means of a plurality of fastening members, generally designated 50, which are located one in each of the recessed portions 42 of the cover member 26 and are adapted to operatively engage the wheel studs 24. More particularly and as best seen in FIG. 3, each of the fastening members 50 comprises an enlarged head section 52 which is formed with a plurality of wrench engaging face portions or facets 54, and an elongated, generally cylindrical shaped shank portion 56 which defines a central internally threaded bore 58 adapted to threadably receive one of the wheel mounting studs 24. The axially inner ends of the fastening members 50 are formed with enlarged diameter counter bores 60 and chamfered or tapered face portions 62, the former of which are adapted to act as a guide means in facilitating assembly of the fastening members 50 on the mounting studs 24.

As best seen in FIG. 3, each of the fastening members 50 is provided with a generally annular retaining member, generally designated 64, which includes a cylindrical collar portion 66 that defines a central annular bore 68 adapted to receive the shank portion 56 of its associated fastening member 50. The axially inner ends of the collar portions 66 are formed with inwardly extending annular shoulders 70 having inclined face portions 72 that are adapted to be engaged by the tapered face portions 62 of the associated fastening member 50, as will hereinafter be described. In a preferred construction of the present invention, the retaining members 64 are fabricated of a resilient material such as rubber or the like, and are formed with a plurality of radially directed slots 73 on the axially inner ends thereof. The axially outer end of each of the retaining members 64 is formed with an enlarged thickness, radially outwardly extending bearing section 74 which includes an axially inwardly extending annular leg portion 76 adapted to abut against the end wall 46 of the associated recessed portion 42. It will be seen that when the fastening members 50 are threadably advanced along the mounting studs 24, the head sections 52 of the fastening members 50 will abut against and bear upon the sections 74 of the retaining members 64.

Together with the retaining members 64, each of the fastening members 50 is operatively associated with an annular sleeve member 78 which defines a central annular bore 80 having a diameter equal to or slightly larger than the outside diameter of the collar portion 66 of the retaining member 64. The sleeve members 78 are adapted to be mounted coaxially of the mounting studs 24 and have the axially outer ends thereof about against the axially inner sides of the end walls 46 of the hub cover member 26. The axially inner ends of the sleeve members 78 are adapted to abut against the axially outer sides of the spider member 14 circumjacent the stud receiving openings 22, as best illustrated in FIG. 3. Preferably, the sleeve members 78 are fabricated of inner and outer layers of resilient material, such as rubber or the like, with a suitable layer of reinforcing material, as seen at 82, provided interjacent the radially inner and outer resilient layers, whereby the sleeve members 78, although being of a resilient character, are sufficiently rigid to resist deformation in an axial direction in the absence of a substantial axially directed force exerted thereagainst.

Upon assembly, the wheel 12 is initially mounted on the hub portion 20 such that each of the mounting studs 24 is received within one of the openings 22 in the spider member 14. Thereafter, the hub cover member 26 is axially aligned with the spider member 14, with the recessed portions 42 being circumferentially aligned such that the openings 48 therein are each axially aligned with one of the stud receiving openings 22. After the hub cover member 26 is properly oriented, the retaining members 64 are coaxially aligned with each of the openings 48 and the sleeve members 78 are interposed between the axially inner side of the hub cover member 26 and the axially outer side of the spider member 14. The fastening members 50 are then inserted through the bores 68 of the retaining members 64 and are threadably advanced onto the axially outer ends of the mounting studs 24 by means of a suitable wrench-like tool, socket or the like, in the manner well known in the art. As the shank portions 56 of the fastening member 50 are threaded along the mounting studs 24, the tapered face portions 62 thereof initially engage the inclined face portions 72 of the retaining member shoulders 70, as shown in FIG. 2. By virtue of the provision of the slots 73, upon further advancement of the fastening members 50 along the mounting studs 24, the face portions 72 bias or deform the shoulders 70 radially outwardly from the position shown in FIG. 3 to the position shown in FIG. 2, with the result that the shoulders 70 become embedded in the inner periphery of the sleeve members 78 and force the sleeve members 78 to bulge or "bow" outwardly as shown in FIG. 2. The fastening members 50 are finally advanced along the mounting studs 24, until the face portions 72 are nestingly received within generally conically shaped counter bores 84 formed on the axially outer side of the openings 22 in the spider member 14. The lengths of the fastening member shank portions 56 and the sleeve members 78 are dimensioned such that the sleeve members 78 are maintained under a state of compression when the fastening members 50 are completely mounted on the studs 24, with the result that the sleeve members 78 exert an axially outwardly directed force against the axially inner sides of the hub cover member, 26, thereby assuring against any relative movement between the cover member 26 and wheel 12. Also, the members 50 and 78 are dimensioned such that a small annular clearance is provided between the axially inner side of the bead portion 36 of the cover member 26 and the outwardly projecting portion 38 of the spider member 14, whereby to provide for drainage of any moisture or the like which may accumulate between the spider member 14 and hub cover member 26. By virtue of the fact that the retaining members 64 are maintained under a state of compression between the fastening members 50 and the hub cover member 26, the sections 74 of the retaining members 64 evert an axially outwardly directed force against the head sections 52 of the members 50, whereby the retaining members 64 function as a type of lock washer to prevent any relative rotational or loosening movement of the fastening members 50 relative to the mounting studs 24, hence precluding inadvertent disengagement of the fastening members 50 from the assembly 10 of the present invention.

While it will be apparent that the preferred embodiment illustrated herein is well calculated to fulfill the objects above stated, it will be appreciated that the present invention is susceptible to modification, variation and change without departing from the proper scope of fair meaning of the subjoined claims.

I claim:

1. In combination in a vehicle wheel assembly including a wheel comprising a wheel spider member having a central mounting portion and a peripheral rim engaging portion, with said mounting portion defining a central hub receiving opening and a plurality of circumferentially spaced stud receiving openings arranged radially outwardly from said wheel central opening.

a wheel cover member having a central section, an outer peripheral section, and an intermediate section arranged radially between said central and peripheral sections, said cover member being formed with a plurality of circumferentially spaced openings each of which is radially and axially aligned with one of said stud receiving openings in said spider member.

a plurality of fastening members extending through said openings in said wheel cover member and threadably engaged with the wheel studs for operatively securing said wheel and staid wheel cover member to the vehicle, said wheel cover member being formed with a plurality of circumferentially spaced recessed portions radially and axially aligned with said stud receiving openings and adapted to have said fastening members recessed therewithin, a plurality of resilient annular sleeves interposed between said spider member and said wheel cover member and aligned with said stud receiving openings, a plurality of resilient retaining members disposed one on each of said fasteners members, said fastener members having inclined face portions engageable with portions of said retaining members for biasing said portions of said retaining members outwardly into embedding engagement with said resilient sleeve members.

2. The combination as set forth in claim 1 wherein said portions of said retaining members are formed with a plurality of radially directed slots to permit radial expansion of said portions upon engagement of said fastening members therewith.

3. In combination in a vehicle wheel assembly including a wheel comprising a wheel spider member having a central mounting portion and a peripheral rim engaging portion, with said mounting portion defining a central hub receiving opening and a plurality of circumferentially spaced stud receiving openings arranged radially outwardly from said central opening, a wheel cover member having a central section, an outer peripheral section, and an intermediate section arranged radially between said central and peripheral sections, said cover member being formed with a plurality of circumferentially spaced openings each of which is radially and axially aligned with one of said stud receiving openings in said spider member, a plurality of fastening members extending through said openings in said wheel cover member and threadably engaged with the wheel studs for operatively securing said wheel and said wheel cover member to the vehicle, a plurality of resilient angular sleeves inteposed between said spider member and said wheel cover member and aligned with said stud receiving openings, a plurality of resilient retaining members disposed one on each of said fastening members, said fastening members having outwardly inclined face portions engageable with said retaining members for biasing portions of said retaining members outwardly into embedding engagement with said resilient sleeve members.

4. In combination in a vehicle wheel assembly including a wheel comprising a wheel spider member having a central mounting portion and a peripheral rim engaging portion, with said mounting portion defining a central hub receiving opening and a plurality of circumferentially spaced stud receiving openings arranged radially outwardly from said central opening, a wheel cover member having a central section, an outer peripheral section, and an intermediate section arranged radially between said central and peripheral sections, said cover member being formed with a plurality of circumferentially spaced openings each of which is radially and axially aligned with one of said stud receiving openings in said spider member, a plurality of fastening members extending through said openings in said wheel cover member and threadably engaged with the wheel studs for operatively securing said wheel and said wheel cover member to the vehicle, each of said fastening members comprises a bolt head section and a shank section defining a threaded bore and adapted to threadably receive a wheel stud therewithin, said shank sections of said fastening members being formed with tapered end portions, a plurality of resilient retaining members disposed one on the shank section of each of said fastener members, said retaining members having deformable inwardly extending portions engageable with said tapered end portions, whereby said deformable portions are biased outwardly upon preselected movement of said fastening members.

5. In combination in a vehicle wheel assembly including a wheel comprising a wheel spider member having a central mounting portion and a peripheral rim engaging portion, with said mounting portion defining a central hub receiving opening and a plurality of circumferentially spaced stud receiving openings arranged radially outwardly from said central opening, a wheel cover member having a central section, an outer peripheral section, and an intermediate section arranged radially between said central and peripheral sections, said cover member being formed with a plurality of circumferentially spaced openings each of which is radially and axially aligned with one of said stud receiving openings in said spider member, a plurality of fastening members extending through said openings in said wheel cover member and threadably engaged with the wheel studs for operatively securing said wheel and said wheel cover member to the vehicle, a plurality of resilient sleeve members interposed between the confronting sides of said wheel cover member and said wheel spider member and arranged substantially coaxially with said fastening members, and means interposed between the outer periphery of said fastening members and the inner periphery of said sleeve members and adapted to radially deform said sleeve members upon preselected axial movement of said fastening members relative thereto, whereby said sleeve members will be maintained in a state of compression between said wheel cover member and said spider member and thereby exert a resilient axially outwardly directed force against said wheel cover member.

6. The combination as set forth in claim 5 wherein said last mentioned means comprises a radially outwardly extending shoulder portion interiorly of each of said sleeve members and deformable radially outwardly upon axially inward movement of said fastening members.

7. The combination as set forth in claim 6 which includes camming face portions on each of said fastening members and said shoulder portions for effecting radially outward movement of said shoulder portions to effect radial expansion of said sleeve members.

References Cited
UNITED STATES PATENTS

| | | | |
|---|---|---|---|
| 1,861,432 | 6/1932 | Barber | 301—37(S) |
| 2,198,721 | 4/1940 | Horn | 301—108(S) |
| 3,279,860 | 10/1966 | Wise | 301—37(CO) |
| 3,356,421 | 12/1967 | Trevarrow | 301—37(S) |

RICHARD J. JOHNSON, Primary Examiner

U.S. Cl. X.R.

301—108